W. G. BROWN & J. W. JEDKINS.

Car-Coupling Attachments.

No. 135,262. Patented Jan. 28, 1873.

Witnesses:
E. Wolff
Sedgwick

Inventor:
W. G. Brown
J. W. Jedkins
per Munn & Co.
Attorneys.

UNITED STATES PATENT OFFICE.

WILLIAM G. BROWN AND JAMES W. JEDKINS, OF MONMOUTH, MAINE.

IMPROVEMENT IN CAR-COUPLING ATTACHMENTS.

Specification forming part of Letters Patent No. 135,262, dated January 28, 1873.

*To all whom it may concern:*

Figure 1:
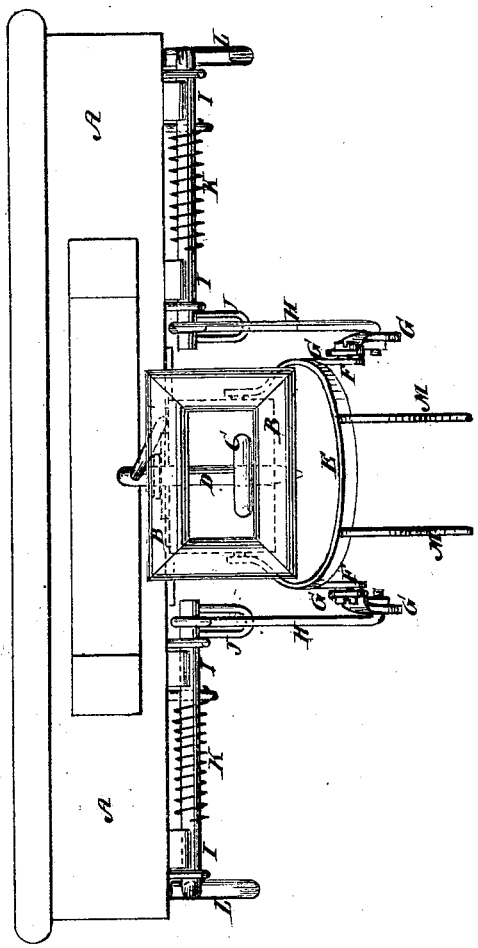
Figure 2:
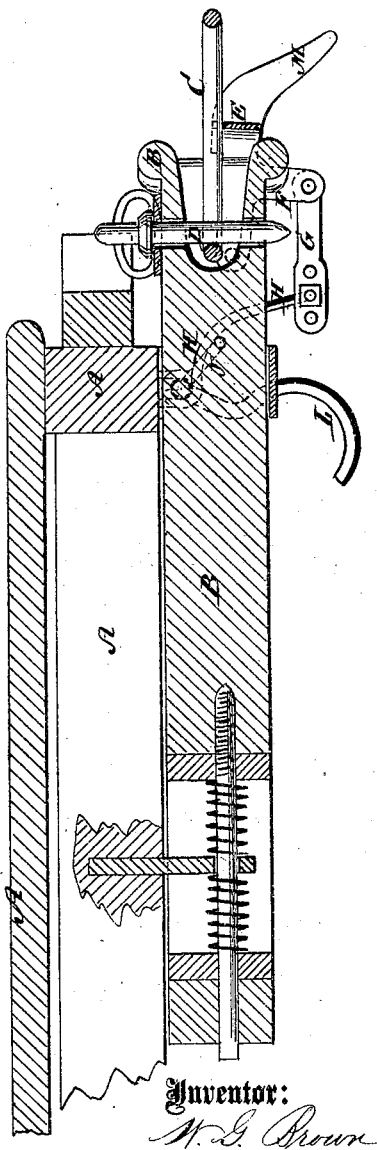

Be it known that we, WILLIAM G. BROWN and JAMES W. JEDKINS, of Monmouth, in the county of Kennebec and State of Maine, have invented a new and useful Improvement in Car-Coupling Attachment, of which the following is a specification:

Figure 1 is a front view of a car-coupling to which our improved attachment has been applied. Fig. 2 is a detail sectional view of the same.

Similar letters of reference indicate corresponding parts.

Our invention has for its objects to furnish an improved device by means of which the operation of coupling the cars may be simple, easy, and perfectly safe, and which shall be inexpensive in manufacture, readily applied to cars, sure in its operation, not liable to get out of order, and will remove the necessity of the operator's going between the cars when coupling them. The invention consists in the combination of the bail, provided with downwardly-inclined arms, the downwardly-projecting side arms, the connecting-bars, the levers, the shafts, the shaft-arms, the springs, and the levers with each other to adapt them to be connected with a car-coupling, as hereinafter fully described.

A represents the frame-work of a car, and B is the draw-bar, in the forward or outer end of which is formed the cavity to receive the coupling-link C, and through which the coupling-pin D passes, in the ordinary manner. E is a bail, the ends of which are pivoted to the opposite sides of the draw-head B, and which is made of such a length that it may move up and down in front of the bumper-head B. To the arms of the bail E are secured or upon them are formed downwardly-projecting arms F, to the lower ends of which are pivoted the forward ends of the connecting-bars G, the rear ends of which are pivoted to the lower end of the levers H, the upper ends of which are pivoted to the shaft I. To the shaft I is rigidly attached an arm, J, which projects beneath the lever H to operate it. The shaft I works in bearings attached to the frame A of the car. K is a spring, which is coiled around the shaft I, and one of its ends is secured to said shaft. The other end of the spring K is secured to the car-frame A, so as to hold the said shaft I securely, except when operated to raise the bail E. Upon the outer ends of the shafts I are formed or to them are rigidly attached levers L. The levers L are curved downward, rearward, and upward, as shown in Fig. 2, so that when the bail E is lowered the levers L may be entirely out of the way, and may be conveniently grasped to raise the bail E, and thus raise the link so that it will surely enter the bumper-head of the adjacent car. To the forward part or bow of the bail E are attached or upon it are formed two arms, M, which project forward and downward, as shown in Figs. 1 and 2, so that as the cars are run together, should the attendant neglect to lower the bail E, the bumper of the adjacent car may strike the arms M and push the bail E down so that it may not be struck and injured by the bumper-heads as they come together. The bars G are made with several holes, so that they may be adjusted according as the bumpers B project more or less.

This construction of the operating parts relieves the device from any strain as the draw-bar moves out and in in starting and stopping the cars.

Having thus described our invention, we claim as new and desire to secure by Letters Patent—

The combination of the bail E, provided with downwardly-inclined arms M, the side arms F, connecting-bars G, levers H, shafts I, arms J, springs K, and levers L with each other to adapt them to be connected with a car-coupling, substantially as herein shown and described, and for the purpose set forth.

WM. G. BROWN.
    JAMES W. JEDKINS.

Witnesses:
 WM. H. H. BROWN,
 AMBROSE BEAL.